(12) United States Patent
Velamakanni et al.

(10) Patent No.: US 7,855,160 B2
(45) Date of Patent: Dec. 21, 2010

(54) CATALYST INK

(75) Inventors: Bhaskar V. Velamakanni, Woodbury, MN (US); David Robert Mekala, Maplewood, MN (US); Eric Joseph Hanson, Hudson, WI (US)

(73) Assignee: 3M Innovative Properties Company, Saint Paul, MN (US)

(*) Notice: Subject to any disclaimer, the term of this patent is extended or adjusted under 35 U.S.C. 154(b) by 0 days.

(21) Appl. No.: 12/840,859

(22) Filed: Jul. 21, 2010

(65) Prior Publication Data

US 2010/0285951 A1 Nov. 11, 2010

Related U.S. Application Data

(62) Division of application No. 10/315,589, filed on Dec. 10, 2002, now abandoned.

(51) Int. Cl.
*H01M 4/88* (2006.01)
*B01J 31/00* (2006.01)

(52) U.S. Cl. .............. 502/159; 502/101; 502/168; 429/40; 429/42; 429/44

(58) Field of Classification Search ............ 429/40, 429/42, 44; 502/101, 159, 168
See application file for complete search history.

(56) References Cited

U.S. PATENT DOCUMENTS

| | | |
|---|---|---|
| 5,211,984 A | 5/1993 | Wilson |
| 5,474,857 A | 12/1995 | Uchida et al. |
| 5,716,437 A | 2/1998 | Denton et al. |
| 5,723,173 A | 3/1998 | Fukuoka et al. |
| 5,861,222 A | 1/1999 | Fischer et al. |
| 5,869,416 A | 2/1999 | Mussell |
| 5,871,552 A | 2/1999 | Tada |
| 5,906,716 A | 5/1999 | Mertesdorf et al. |
| 6,060,187 A | 5/2000 | Uchida et al. |
| 6,344,428 B1 | 2/2002 | Lim et al. |
| 6,462,095 B1 | 10/2002 | Bonsel et al. |
| 6,492,295 B2 * | 12/2002 | Hitomi et al. ............ 502/159 |
| 6,579,932 B1 | 6/2003 | Schipper et al. |
| 6,696,382 B1 | 2/2004 | Zelenay et al. |
| 6,844,286 B2 | 1/2005 | Kohler et al. |
| 2001/0024748 A1 | 9/2001 | Mizuno et al. |
| 2002/0019308 A1 | 2/2002 | Hitomi et al. |
| 2002/0034674 A1 | 3/2002 | Starz et al. |
| 2002/0045081 A1 | 4/2002 | Nanaumi et al. |
| 2002/0136940 A1 | 9/2002 | Mao et al. |
| 2003/0207167 A1 * | 11/2003 | Prakash et al. ............ 429/42 |
| 2004/0265676 A1 | 12/2004 | Takagi et al. |

FOREIGN PATENT DOCUMENTS

| | | |
|---|---|---|
| EP | 0 955 687 A2 | 11/1999 |
| GB | 2 316 802 A | 3/1998 |
| JP | 2000-353528 | 12/2000 |
| JP | 2001-1160400 | 6/2001 |
| JP | 2001-273907 A | 10/2001 |
| JP | 2001-1160401 | 12/2001 |
| JP | 2002-075383 | 3/2002 |
| WO | WO 01/71835 A2 | 9/2001 |

OTHER PUBLICATIONS

Aldrich Catalog and Handbook of Fine Chemicals, 1990-1991, pp. 939.
Aldrich Catalog and Handbook of Fine Chemicals, 1998-1999, pp. 1183.

* cited by examiner

*Primary Examiner*—James E McDonough
(74) *Attorney, Agent, or Firm*—Philip Y. Dahl

(57) ABSTRACT

A catalyst ink is provided, comprising: 25-95% by weight water; 1-50% by weight of at least one solid catalyst, typically a highly dispersed platinum catalyst; 1-50% by weight of at least one polymer electrolyte in acid ($H^+$) form; and 1-50% by weight of at least one polar aprotic organic solvent. The catalyst ink typically has a viscosity at 1 $sec^{-1}$ of 10 Pa·sec or less. The catalyst ink typically does not ignite spontaneously when dried to completion in air at a temperature of 80° C. or greater. The catalyst ink may be used in the fabrication of membrane electrode assemblies for use in fuel cells.

14 Claims, No Drawings

CATALYST INK

CROSS REFERENCE TO RELATED APPLICATIONS

This application is a divisional of U.S. Ser. No. 10/315,589, filed Dec. 10, 2002, now abandoned the disclosure of which is incorporated by reference in its entirety herein.

FIELD OF THE INVENTION

This invention relates to a catalyst ink composition, typically for use in the fabrication of membrane electrode assemblies used in fuel cells.

BACKGROUND OF THE INVENTION

European Patent Application EP 0 955 687 A2 discloses a method for preparing a slurry for forming a catalyst layer of a PEM fuel cell electrode. In the disclosed method, MOH is added to a water/alcohol solution of a perfluorosulfonate ionomer (PFSI) (such as Nafion™) to convert the PFSI to M⁺ form. An organic polar solvent such as dimethyl sulfoxide, N,N-dimethyl formamide or ethylene glycol is added ('687 at para. 24, para. 27, and claim 6). The mixture is then heated to drive off alcohol and catalyst is added to form the slurry. After the slurry has been applied to a backing layer and dried to form a catalyst layer, the catalyst layer is treated with acid to convert the PFSI from $M^+$ form to $H^+$ form. ('687 at para. 44 and claim 5).

U.S. Patent Application Publication US2002/0045081 discloses the use of sulfonated PEEK polymers dissolved in N-methyl pyrrolidone (NMP), a polar aprotic solvent ('081 at Example 1).

U.S. Pat. No. 5,906,716 discloses a metalized cation exchange membrane preferably made with a cation-exchange polymer that is soluble in a polar aprotic solvent (such as NMP) and comprises arylene units in the backbone of the polymer, e.g., sulfonated PEEK polymers ('716 at Example 1).

U.S. Patent Application Publication US2002/0019308 discloses a composite catalyst.

Japanese Unexamined Patent Publication 2000-353528 discloses a porous electrode catalyst layer and a method of making a porous electrode catalyst layer. The Examples appear to disclose the use of a solution of Nafion™ in NMP, obtained by solvent exchange of a stock solution of Nafion™.

Japanese Unexamined Patent Publication 2001-273907A discloses a porous electrode catalyst layer and a phase separation method of making a porous electrode catalyst layer. The Examples appear to disclose the application of suspension of catalyst in Nafion™ solution followed by drying and then application of a PVdF/NMP solution followed by solvent exchange with water to create a porous layer of PVdF.

International Patent Application WO 01/71835 A2 discloses a method of manufacturing a membrane/electrode composite.

UK Patent Application GB 2 316 802 A discloses gas diffusion electrodes based on polyethersulfone carbon blends.

U.S. Pat. No. 5,716,437 discloses an aqueous ink for use in electrode manufacture.

WO 99/21239 discloses a method for the production of metal colloid solutions by reducing dissolved catalyst metals in the presence of a cation exchange polymer.

SUMMARY OF THE INVENTION

Briefly, the present invention provides a catalyst ink comprising: 25-95% by weight water; 1-50% by weight of at least one solid catalyst, typically a highly dispersed platinum catalyst; 1-50% by weight of at least one polymer electrolyte in acid ($H^+$) form; and 1-50% by weight of at least one polar aprotic organic solvent. The catalyst ink typically has a viscosity at 1 $sec^{-1}$ of 10 Pa·sec or less. The catalyst ink typically does not ignite spontaneously when dried to completion in air at a temperature of 80° C. or greater.

In this application:

"highly dispersed platinum catalyst" means a platinum-containing catalyst having a specific surface area of greater than 100 $m^2/g$, more typically greater than 500 $m^2/g$, and most typically greater than 900 $m^2/g$, such as a catalyst dispersed on a powdered carbon support;

"highly fluorinated" means containing fluorine in an amount of 40 wt % or more, typically 50 wt % or more and more typically 60 wt % or more;

"dried to completion" means dried until water content is essentially in equilibrium with ambient air, or lower; and "standard boiling point" means the boiling point reported in standard reference works.

It is an advantage of the present invention to provide a catalyst ink, in particular a catalyst ink for use in fuel cell fabrication, which exhibits favorable rheology during application and does not spontaneously ignite when dried to completion in air at an elevated temperature.

DETAILED DESCRIPTION OF PREFERRED EMBODIMENTS

The present invention provides a catalyst ink comprising: 25-95% by weight water; 1-50% by weight of at least one solid catalyst, typically a highly dispersed platinum catalyst; 1-50% by weight of at least one polymer electrolyte in acid ($H^+$) form; and 1-50% by weight of at least one polar aprotic organic solvent. The catalyst ink typically has a viscosity at 1 $sec^{-1}$ of 10 Pa·sec or less. The catalyst ink typically does not ignite spontaneously when dried to completion in air at a temperature of 80° C. or greater.

The catalyst ink according to the present invention may be used in the fabrication of membrane electrode assemblies (MEA's) for use in fuel cells. An MEA is the central element of proton exchange membrane fuel cells such as hydrogen fuel cells. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. The anode and cathode electrode layers may be applied to the PEM in the form of a catalyst ink to form a catalyst coated membrane (CCM). Fluid transport layers (FTL's) facilitate gas transport to and from the anode and cathode electrode materials and conduct electrical current. In a typical PEM fuel cell, protons are formed at the anode via hydrogen oxidation and transported to the cathode to react with oxygen, allowing electrical current to flow in an external circuit connecting the electrodes. The FTL may also be called a gas diffusion layer (GDL) or a diffuser/current collector (DCC). In an alternate manufacturing method, the anode and cathode electrode layers may be applied to the FTL in the form of a catalyst ink, rather than to the PEM, and the coated FTL's sandwiched with a PEM to form an MEA.

Any suitable catalyst may be used in the practice of the present invention. The catalyst is typically a highly dispersed platinum catalyst having a specific surface area of greater than 100 m$^2$/g, more typically greater than 500 m$^2$/g, and most typically greater than 900 m$^2$/g. Typically, carbon-supported catalyst particles are used. Typical carbon-supported catalyst particles are 50-90% carbon and 10-50% catalyst metal by weight, the catalyst metal typically comprising Pt for the cathode and Pt and Ru in a weight ratio of 2:1 for the anode.

Any suitable polymer electrolyte may be used in the practice of the present invention. The polymer electrolyte is typically highly fluorinated or perfluorinated. The polymer electrolyte is typically an acid-functional fluoropolymer, such as Nafion® (DuPont Chemicals, Wilmington Del.) and Flemion™ (Asahi Glass Co. Ltd., Tokyo, Japan). The polymer electrolytes useful in inks for use in the present invention are typically copolymers of tetrafluoroethylene and one or more fluorinated, acid-functional comonomers. Typically the polymer electrolyte bears sulfonate functional groups. Typically the polymer electrolyte contains no arylene units in the polymer backbone. Most typically the polymer electrolyte is Nafion®. The polymer electrolyte typically has an equivalent weight of 1200 or less, more typically 1100 or less, more typically 1050 or less, and most typically about 1000. In the ink according to the present invention, the polymer electrolyte is substantially in protonated form or acid (H$^+$) form, rather than in salt form.

The polar aprotic organic solvent typically has a standard boiling point of at least 80° C., more typically at least 100° C., more typically at least 160° C., and most typically at least 200° C. The polar aprotic organic solvent is typically selected from the group consisting of: dimethylsulfoxide (DMSO), N,N-dimethyacetamide (DMA), ethylene carbonate, propylene carbonate, dimethylcarbonate, diethylcarbonate, N,N-dimethylformamide (DMF), N-methylpyrrolidinone (NMP), dimethylimidazolidinone, acetonitrile, butyrolactone, hexamethylphosphoric triamide, isobutyl methyl ketone, and sulfolane; and more typically selected from the group consisting of N-methyl pyrrolidinone (NMP), N,N-dimethylformamide, N,N-dimethylacetamide, dimethylsufoxide (DMSO) and acetonitrile. Most typically, the polar aprotic organic solvent is N-methyl pyrrolidinone (NMP).

The catalyst ink typically contains 25-95% water, more typically 50-80% water, and more typically 60-75% water. The catalyst ink typically contains 1-50% solid catalyst, more typically 5-25% solid catalyst, and more typically 10-20% solid catalyst. The catalyst ink typically contains 1-50% polymer electrolyte, more typically 1-20% polymer electrolyte, more typically 1-10% polymer electrolyte, and more typically 3-8% polymer electrolyte. The catalyst ink typically contains 1-50% of a second solvent, typically a polar aprotic organic solvent, more typically 3-25% polar aprotic organic solvent, more typically 5-15% polar aprotic organic solvent, and more typically 8-14% polar aprotic organic solvent. The catalyst ink typically contains 5-30% solids (i.e. polymer and catalyst).

The ink may be mixed by any suitable method. The ink is typically made by stirring with heat which may be followed by dilution to a coatable consistency. The ink typically has a viscosity at 1 sec$^{-1}$ of 10 Pa·sec or less, more typically 6 Pa·sec or less, more typically 2 Pa·sec or less, and most typically 1.0 Pa·sec or less.

The ink may be used in the manufacture of a CCM or MEA for use in a fuel cell. The ink may be applied to a PEM or FTL by any suitable means, including both hand and machine methods, including hand brushing, notch bar coating, fluid bearing die coating, wire-wound rod coating, fluid bearing coating, slot-fed knife coating, three-roll coating, or decal transfer. In the case of decal transfer, the ink is first applied to a transfer substrate and dried, and thereafter applied as a decal to a PEM. Coating may be achieved in one application or in multiple applications. After coating, the ink may be dried in an oven or the like, in air, at temperatures in excess of 80° C., more typically in excess of 110° C., and more typically in excess of 140° C. The ink according to the present invention preferably will not self-ignite when dried to completion under these conditions. Typically, an ink that will not self-ignite during drying will also be more safe to manufacture, handle and use.

This invention is useful in the fabrication of membrane electrode assemblies for use in fuel cells.

Objects and advantages of this invention are further illustrated by the following examples, but the particular materials and amounts thereof recited in these examples, as well as other conditions and details, should not be construed to unduly limit this invention.

Examples

Unless otherwise noted, all reagents were obtained or are available from Aldrich Chemical Co., Milwaukee, Wis., or may be synthesized by known methods.

Formulation of Inks

With reference to Table I, several catalyst inks were made, including comparative catalyst inks and catalyst inks according to the present invention. Anode inks (Examples 1C (comparative), 2C (comparative), and 3-6) and cathode inks (Examples 7C (comparative), 8C (comparative), 9 and 10) were made.

Anode inks were made as follows: 30 g of catalyst powder (SA27-13RC, 27% Pt & 13% Ru on 60% carbon from N.E. Chemcat Corp., Tokyo, Japan) were weighed into a (16 oz) glass jar (8.9 cm diameter by 8.9 cm height). Then, 112.2 g of a Nafion™ solution (SE-10172, 10% in Water, CAS #31175-20-9, DuPont Fluoroproducts, Wilmington, Del., USA) were gradually added to the catalyst powder in the glass jar while the contents were uniformly dispersed with a spatula to ensure no dry clumps of catalyst powder remained in the mixture. The glass jar was then placed in ice bath, to minimize solvent evaporation, under a rotor-stator high-shear mixer (Ultra-Turrax T25, IKA Works, Wilmington, N.C.) and deagglomerated for 1 minute at 16,000 rpm. Then 20.4 g of the additional solvent indicated in Table I was added and high-shear mixing at 16,000 rpm was continued for an additional 10 min. Additional solvents were selected from: Water (B.P. 100° C.), Ethylene Glycol (B.P. 197° C., CAS #107-21-1), N-methyl pyrrolidinone (NMP) (B.P. 202° C., CAS #872-50-4), N,N-Dimethylformamide (DMF) (B.P. 153° C. CAS #68-12-2), N,N-Dimethylacetamide (DMA) (B.P. 165° C., CAS #127-19-5), and Dimethylsulfoxide (DMSO) (B.P. 189° C., CAS #67-68-5). After high shear deagglomeration, a rubber spatula was used to scrape the catalyst dispersion off the rotor-stator mixing head and off the wall of the glass jar and the jar was tightly sealed to prevent solvent loss from the catalyst dispersion.

Cathode inks were made as follows: 30 g of catalyst powder (SA50BK, 50% Pt on 50% carbon from N.E. Chemcat Corp., Tokyo, Japan) were weighed into a (16 oz) glass jar (8.9 cm diameter by 8.9 cm height). Then, 84 g of a Nafion™ solution (SE-10172, 10% in Water, CAS #31175-20-9, DuPont Fluoroproducts, Wilmington, Del., USA) were gradually added to the catalyst powder in the glass jar while the contents were uniformly dispersed with a spatula to ensure no dry clumps of catalyst powder remained in the mixture. 80.1 g of additional water were added. The glass jar was then placed in ice bath, to minimize solvent evaporation, under a rotor-stator high-shear mixer (Ultra-Turrax T25, IKA Works, Wilmington, N.C.) and deagglomerated for 1 minute at 16,000 rpm. Then 22.5 g of the additional solvent indicated in Table I was added and high-shear mixing at 16,000 rpm was continued for an additional 10 min. Additional solvents were selected from: Water (B.P. 100° C.), Ethylene Glycol (B.P. 197° C., CAS #107-21-1), N-methyl pyrrolidinone (NMP) (B.P. 202° C., CAS #872-50-4), and Acetonitrile (B.P. 81.6° C., CAS #75-05-8). After high shear deagglomeration, a rubber spatula was used to scrape the catalyst dispersion off the rotor-stator mixing head and off the wall of the glass jar and the jar was tightly sealed to prevent solvent loss from the catalyst dispersion. For Example 10, the weights reported above were cut to one third, i.e., 10 g of anode catalyst powder, 28 g of Nafion™ solution, 26.7 g of additional water and 7.5 g of additional solvent (acetonitrile) were used.

where, "k" is a constant that indicates viscosity at 1 sec$^{-1}$ and "n" is the Power Law Index (PLI), which indicates of the effect of shear on viscosity. If the shear viscosity of a material is insensitive to shear rate, i.e., the fluid is a Newtonian fluid, the PLI is 1.0. Those dispersions whose viscosity decreases with shear are non-Newtonian and known as thixotropic. The PLI of these thixotropic fluids range from 0 to 1. The principles of the power law index are further described in C. W. Macosko, "Rheology: Principles, Measurements, and Applications", ISBN #1-56081-579-5, at page 85, incorporated herein by reference.

Incineration was tested by notch-bar application of a 3" (7.6 cm) wide by 3-mil (76 micron) thick coating of the catalyst ink on a release liner comprising a 1-mil thick silicone-coated microstructured polypropylene having microfeatures with a depth of about 50 micron. Immediately after coating, the coating along with the liner were placed in aluminum pan and placed in a convective air oven at 140° C. The coating was allowed to dry for 10 min. Later, the coatings were examined for either complete drying or incineration of the catalyst coating.

TABLE I

|  | Ex. 1C | Ex. 2C | Ex. 3 | Ex. 4 | Ex. 5 | Ex. 6 |
|---|---|---|---|---|---|---|
| Type of Ink | Anode | Anode | Anode | Anode | Anode | Anode |
| Additional Solvent | Water | Ethyene Glycol | NMP | NMF | DMA | DMSO |
| Type of Solvent | Inorganic | Protic-Organic | Aprotic-Organic | Aprotic-Organic | Aprotic-Organic | Aprotic-Organic |
| Total Solids | 25.4% | 25.4% | 25.4% | 25.4% | 25.4% | 25.4% |
| Flocculation | strong | weak | weak | weak | weak | weak |
| Viscosity at 1 sec$^{-1}$ (Pa·sec) | 14.5 | 0.92 | 0.9 | 1.67 | 5.79 | 1.86 |
| Power Law Index | 0.3956 | 0.6622 | 0.6604 | .06155 | 0.5016 | 0.6014 |
| Incineration | No | Yes | No | No | No | No |

|  | Ex. 7C | Ex. 8C | Ex. 9 | Ex. 10 |
|---|---|---|---|---|
| Type of Ink | Cathode | Cathode | Cathode | Cathode |
| Additional Solvent | Water | Ethylene Glycol | NMP | Acetonitrile |
| Type of Solvent | Inorganic | Protic-Organic | Aprotic-Organic | Aprotic-Organic |
| Total Solids | 17.7% | 17.7% | 17.7% | 17.7% |
| Flocculation | strong | strong | weak | weak |
| Viscosity at 1 sec$^{-1}$ (Pa·sec) | 14.6 | 12.62 | 0.45 | 0.95 |
| Power Law Index | 0.2509 | 0.2414 | 0.6823 | 0.6361 |
| Incineration | No | Yes | No | No |

Properties of Inks

The ink from each Example was examined for flocculation, measured for viscosity, and tested for incineration under drying conditions.

The ink from each Example was examined for flocculation by eye and classified as strongly flocculated or weakly flocculated. The results are reported in Table I.

A Bohlin Constant Stress Rheometer (available from Bohlin Instruments Inc., East Brunswick, N.J.) was used to continuously measure the viscosity of a catalyst dispersion as a function of shear rate. Flow properties under constant stress conditions were measured using a C14 cup-and-bob geometry at shear rates of between 1 and 800 sec$^{-1}$.

A plot was made of shear viscosity vs. shear rate. Shear rate (S) and shear viscosity (V) are related by the following equation, known as the "Power Law Fluid" equation:

$$V = kS^{(n-1)}$$

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A method for forming an electrode for use in fuel cells, the method comprising:
   a) providing a catalyst ink comprising:
      i) 25-95% by weight water;
      ii) 1-50% by weight of at least one solid catalyst;

iii) 1-50% by weight of at least one polymer electrolyte in acid (H$^+$) form; and
iv) 3-25% by weight of N-methylpyrrolidone (NMP);

b) applying the catalyst ink to a substrate; and c) drying the catalyst ink in air at a temperature of at least 120° C. to form an electrode.

2. The method for forming an electrode according to claim 1 wherein the substrate includes at least one of: a polymer electrolyte membrane (PEM) of a membrane electrode assembly (MEA); a fluid transport layer of an MEA; a transfer substrate; and a combination thereof.

3. The method for forming an electrode according to claim 1 wherein drying the catalyst ink includes drying the catalyst ink in air at a temperature of at least 140° C.

4. The method for forming an electrode according to claim 1 wherein applying the catalyst ink to a substrate includes at least one of hand brushing, notch bar coating, fluid bearing die cutting, wire-wound rod coating, fluid bearing coating, slot-fed knife coating, three-roll coating, and decal transfer.

5. The method for forming an electrode according to claim 1 wherein the substrate includes a transfer substrate and further comprising applying the electrode and transfer substrate to at least one of a PEM and an FTL.

6. The method for forming an electrode according to claim 5 further comprising removing the transfer substrate from the electrode.

7. The method for forming an electrode according to claim 5 wherein said catalyst ink does not ignite spontaneously during drying.

8. A method for forming an electrode for use in fuel cells, the method comprising:
a) providing a catalyst ink comprising:
i) 25-95% by weight water;
ii) 1-50% by weight of at least one highly dispersed platinum catalyst;
iii) 1-50% by weight of at least one polymer electrolyte in acid (H$^+$) form; and
iv) 5-15% by weight of at least one polar aprotic organic solvent;

b) applying the catalyst ink to a substrate; and c) drying the catalyst ink in air at a temperature of at least 120° C. to form an electrode.

9. The method for forming an electrode according to claim 8 wherein the substrate includes at least one of: a polymer electrolyte membrane (PEM) of a membrane electrode assembly (MEA); a fluid transport layer of a MEA; a transfer substrate; and a combination thereof.

10. The method for forming an electrode according to claim 8 wherein drying the catalyst ink includes drying the catalyst ink in air at a temperature of at least 140° C.

11. The method for forming an electrode according to claim 8 wherein applying the catalyst ink to a substrate includes at least one of hand brushing, notch bar coating, fluid bearing die cutting, wire-wound rod coating, fluid bearing coating, slot-fed knife coating, three-roll coating, and decal transfer.

12. The method for forming an electrode according to claim 8 wherein the substrate includes a transfer substrate and further comprising applying the electrode and transfer substrate to at least one of a PEM and an FTL.

13. The method for forming an electrode according to claim 12 further comprising removing the transfer substrate from the electrode.

14. The method for forming an electrode according to claim 8 wherein drying the catalyst ink in air at a temperature of at least 120° C. includes drying the catalyst ink without the catalyst ink spontaneously igniting.

* * * * *

UNITED STATES PATENT AND TRADEMARK OFFICE
CERTIFICATE OF CORRECTION

| | | |
|---|---|---|
| PATENT NO. | : 7,855,160 B2 | |
| APPLICATION NO. | : 12/840859 | |
| DATED | : December 21, 2010 | |
| INVENTOR(S) | : Bhaskar V Velamakanni | |

It is certified that error appears in the above-identified patent and that said Letters Patent is hereby corrected as shown below:

In the Specifications:

Column 3
Line 36; delete "dimethyacetamide"
and insert -- dimethylacetamide -- therefor.

Line 43; delete "dimethylsufoxide"
and insert -- dimethylsulfoxide -- therefor.

Column 6
Line 3; Table 1; Column Ex. 2C; delete "Ethyene"
and insert -- Ethylene -- therefor.

Signed and Sealed this
Twenty-second Day of March, 2011

David J. Kappos
*Director of the United States Patent and Trademark Office*